July 14, 1942.   R. W. STUART   2,289,687
METHOD AND APPARATUS FOR LOGGING WELLS
Filed Feb. 14, 1941   2 Sheets-Sheet 1

Inventor:
Robert W. Stuart
By Clarence H. Seeley
Attorney.

July 14, 1942.   R. W. STUART   2,289,687
METHOD AND APPARATUS FOR LOGGING WELLS
Filed Feb. 14, 1941   2 Sheets-Sheet 2

Inventor:
Robert W. Stuart
By Clarence H. Seeley
Attorney.

Patented July 14, 1942

2,289,687

UNITED STATES PATENT OFFICE 2,289,687

METHOD AND APPARATUS FOR LOGGING WELLS

Robert W. Stuart, Tulsa, Okla., assignor to Stanolind Oil and Gas Company, Tulsa, Okla., a corporation of Delaware Application February 14, 1941, Serial No. 378,967

9 Claims. (Cl. 175—182)

This invention relates to the logging of wells and more particularly to the logging of wells being drilled by the rotary method employing a continuous stream of a drilling fluid. Still more specifically, it relates to a method and apparatus for detecting the nature and extent of the various formations being penetrated by the drill bit.

With the increasing realization of the importance of a thorough knowledge of the nature and fluid content of subsurface formations and their exact depths, various instruments and methods have been devised to assist in obtaining this information. The instruments now in use for this purpose include coring equipment, electrical logging units, side wall samplers, drill stem fluid testers, and more recently, so-called "mud logging" units.

The disadvantages of the older methods in most instances, as compared with mud logging are now well known. Coring, for instance, is a slow and expensive procedure which usually does not give as much information as desired and either causes the drilling operation to be held up until the test results are available, or necessitates further drilling without the benefit of these results and with the consequent danger of drilling through productive formations. Electrical logging also has the undesirable feature that it can be carried out only after the well has been drilled and does not give the desired information when it is most useful, namely, at or before the time the particular formation is being penetrated. Other methods such as side wall sampling and drill stem testing are slow, expensive and very unsatisfactory and likewise do not give any information during the drilling operation.

Mud logging, on the other hand, yields information as to the nature of subsurface formations and particularly as to their fluid constituents, if any, during the drilling operation, at which time appropriate measures can be taken, based upon the test results. In this method advantage is taken of the fact that in a rotary drilling operation the formation penetrated by the drill bit is drilled up and carried by the circulating drilling mud to the top of the well. If the formation penetrated contains a fluid such as oil, gas or salt water, therefore, the presence of these substances can be determined by appropriate tests applied to the drilling mud returns. Since the hydrostatic mud pressure is greater than the pressure existing in any formation, the only formational fluids present in the drilling mud will be those contained in that part of the formation which has been drilled up. Even if no fluids are present, however, it is extremely advantageous to know the nature of the formations traversed as rapidly as possible, and particularly to ascertain when the drill bit is leaving one formation and beginning to penetrate the one immediately below it. Accordingly, by correlating the results of various tests performed on the returning mud with the depth at which the particular portion thereof being tested picked up portions of the formation, a complete log of the nature, extent and depth of the various formations traversed by the well can be obtained, and this log will be available during the drilling operation.

There are a number of different tests which can be applied to drilling mud returns advantageously and preferably a number of them are used simultaneously so that the most complete picture of the nature of the strata being penetrated is obtained. Among these tests are tests for crude oil, hydrocarbon gas, and electrical conductivity. It is also advantageous that all of these tests should be carried out continuously and the results automatically recorded in juxtaposition on a chart so that all of the information will be readily available and in convenient form for correlation.

Heretofore the development work done in connection with the mud logging method has been directed to the detection of fluids which are important from a production standpoint, that is, crude oil and hydrocarbon gas, but it is also very important that information be obtained as to other materials penetrated by the drill bit, and it is to this phase of the mud logging method that the present invention is principally directed. I have found that it is possible by continuously measuring variations in the electrical conductivity and the hydrogen ion concentration of the drilling fluid returning from the bottom of the well to ascertain the presence of a great variety of substances in the strata being drilled. Heretofore an attempt has been made to obtain such information by the use of electrical conductivity measurements alone, but such measurements completely fail to distinguish between salt or salt water and such other ionizable substances as volcanic ash, anhydrite or gypsum, limestone and dolomite. In all of these cases the electrical conductivity of the drilling mud returns is increased and great errors have been made by interpreting such increases as indicating salt or salt water. By determining the hydrogen ion concentration simultaneously, however, it is possible to distinguish most of these substances since salt or salt water causes no appreciable change in the hydrogen ion concentration of the mud. Anhydrite or gypsum, for instance, causes the pH value to fall well below 7. Volcanic ash such as that found in West Texas causes the pH value to decline to about 5, and limestone, and to a lesser extent dolomite, cause the pH value to increase very materially.

It is therefore an object of my invention to provide a simple and efficient method and apparatus for continuously determining the presence of certain important nonhydrocarbon constituents in the formations being penetrated by the rotary method of drilling. Another object is to provide a novel combination of tests to be carried out continuously as a part of a mud logging operation. A further object is to provide improved units for measuring simultaneously the electrical conductivity and hydrogen ion concentration of a stream of drilling fluid returning from a well. Further objects, uses and advantages of my invention will be apparent from the following detailed description read in conjunction with the drawings in which:

Figure 2:
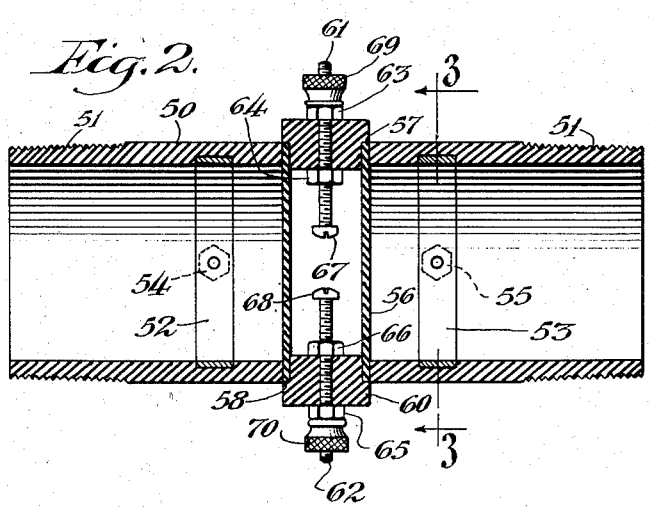
Figure 2 shows in vertical cross-section a preferred form of conductivity cell adapted for use in carrying out my invention.
Figure 4:
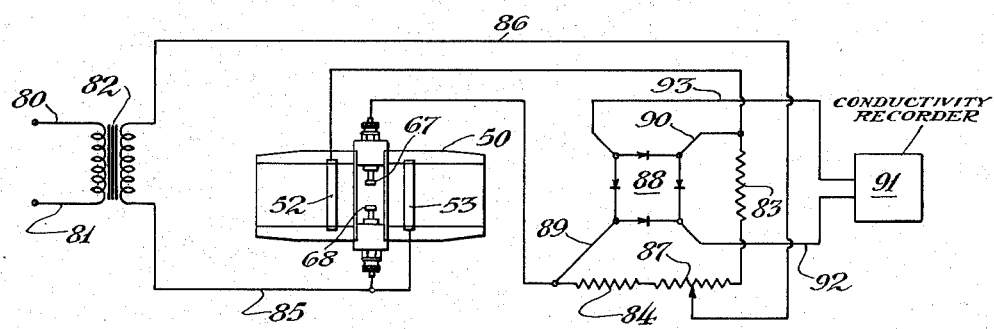
Figure 5:
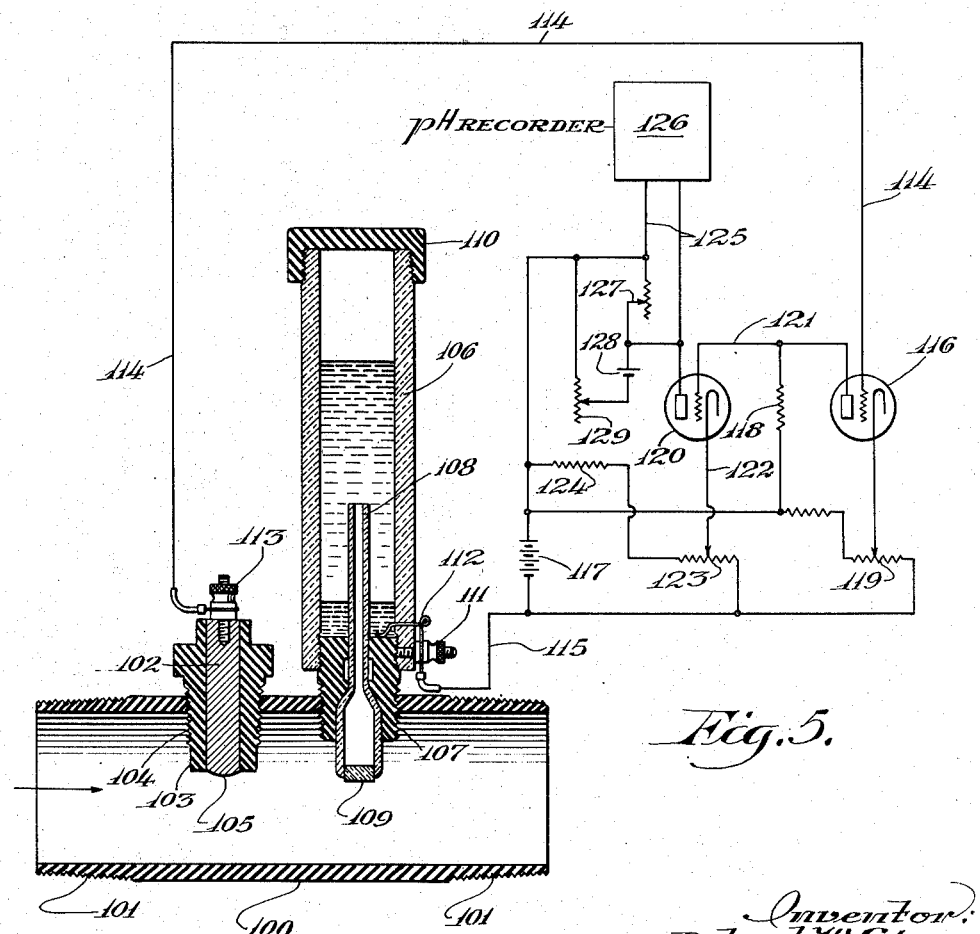

Figure 4 is a circuit diagram illustrating one form of appropriate electrical equipment to be used with the apparatus of Figure 2; and Figure 5 represents a view in cross-section of a cell for hydrogen ion determination according to my invention, together with a diagrammatic representation of a preferred electrical circuit for automatically recording the pH value of the mud flowing through the cell.

In one of its broad aspects my invention comprises the continuous determination of variations in the electrical conductivity and in the hydrogen ion concentration of at least a portion of the drilling fluid returning from the bottom of a well being drilled by the rotary method. Preferably each of these measurements is continuously recorded on the same recording medium so that comparison thereof is greatly facilitated and the records can be immediately interpreted in terms of the nature of the formation being penetrated.

This combination of tests is most advantageous when supplemented by other tests for crude oil and for hydrocarbon gas also arranged to be made on a continuous basis and recorded. This has the important advantage that crude oil, gas and salt water are fluids which slowly migrate into relatively small amounts from formations containing them to the immediately overlying strata. Penetration of these overlying strata will therefore result in the immediate detection of minute amounts of fluid and indicate that the drill bit is probably approaching a formation productive of such fluid, and appropriate measures can then be taken.

Figure 1:
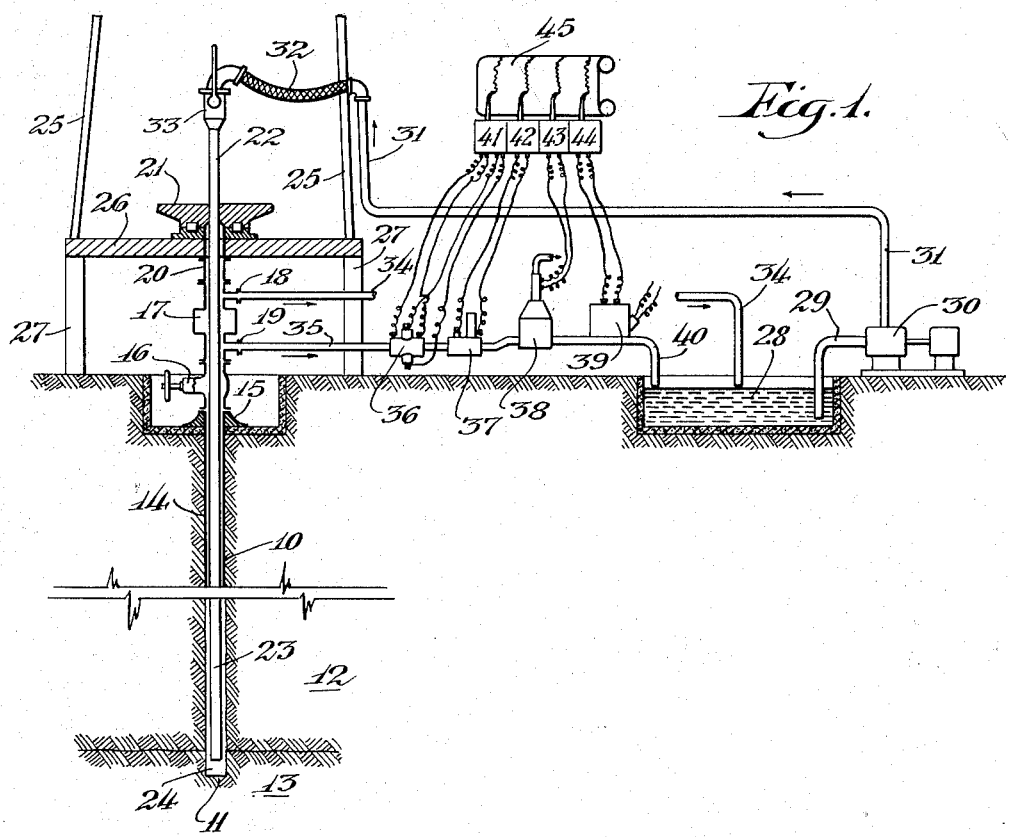
Figure 1 illustrates schematically one form of apparatus according to my invention.

My invention can best be understood in all of its details by reference to the drawings, together with the following description:

Figure 1 shows in highly diagrammatic form a well 10 bottomed at 11, which has penetrated two different formations 12 and 13. As shown, well 10 has a casing 14 within the upper portion thereof supported by a landing base 15 which also supports means for controlling and withdrawing drilling mud from the well, represented by master valve 16, blowout preventer 17 having a mud outlet 18, fill-up line connection 19, and nipple 20.

Well 10 is being drilled in the usual manner by means of rotary table 21, kelly 22, drill pipe 23 and bit 24, and is equipped with the conventional derrick 25, derrick floor 26 and derrick supports 27. Drilling mud is withdrawn from mud pit 28 through line 29 and forced by means of pump 30 through line 31, hose 32, swivel 33, kelly 22, drill pipe 23 and the usual openings in bit 24 to the bottom 11 of well 10, where it picks up cuttings of the formation being drilled. Then the mud passes up the annular space around pipe 23 and the bulk thereof flows out mud outlet 18 and line 34 to pit 28, thus completing the cycle. A great many details have been omitted from the drawings in order to simplify them, but these can be readily supplied by those skilled in the art. For example, the mud returning through line 34 would normally be screened to remove cuttings and means are, of course, essential to support, raise and lower the drill string and to rotate table 21. These other items, however, are not necessary to an understanding of my invention.

A portion of the returning mud containing small amounts of the formation being penetrated by bit 24 passes through fill-up line connection 19 and line 35 to a series of testing units, including units capable of determining electrical conductivity and hydrogen ion concentration. As shown, the mud flows through conductivity unit 36, hydrogen ion determination unit 37, gas detection unit 38 and crude oil detection unit 39, and finally through line 40 to mud pit 28. Preferably, all of these units are mounted together so as to be portable, for instance in a truck or trailer, and are arranged to give continuous or substantially continuous records on a chart or charts.

As shown, each of the testing units 36 to 39, inclusive, has a corresponding recording unit, numbered 41 to 44, inclusive, and all of the latter are arranged to record their test values on a moving medium 45. The recording medium 45 can be arranged to move at a rate proportional to time or depth, but preferably it is driven by suitable apparatus at a rate such that the records are plotted directly against the depth at which the portion of the mud under test was at the bottom of the well, and picked up the formational material contained therein. Appropriate means for moving medium 45 are well-known in the art and are therefore not shown in the drawings.

In carrying out my invention drilling proceeds in the usual manner by rotation of table 21 and mud is continuously circulated by means of pump 30. If it is assumed that well 10 has not yet penetrated formation 13, but is approaching it, and formation 13 contains gas, recorder 43 will gradually show a slowly increasing amount of gas in the mud returns. In this way the proximity of formation 13 can be predicted. If, however, formation 12 is a shale, and formation 13 is a limestone containing no fluid, the interface between these formations will be indicated by a rather abrupt increase in conductivity, as indicated by recorder 41, and also an increase in the pH value of the mud, as determined by recorder 42. If, on the other hand, formation 13 is a volcanic ash, the pH value will decrease while the conductivity will increase. It is apparent, therefore, that the combination of electrical conductivity and hydrogen ion concentration determinations yields valuable information not otherwise obtainable.

Figure 3:
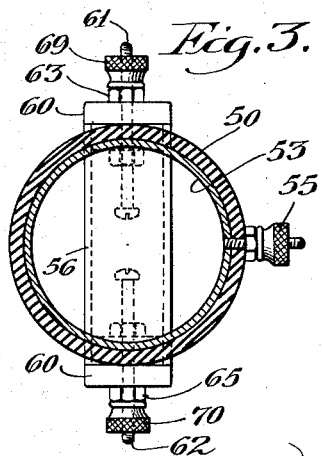
Figure 3 is a vertical cross-section along line 3—3 of Figure 2.

The electrical conductivity test can be carried out by means of unit 36 in a manner well-known to those skilled in the art, but I prefer to use a unit including means for automatically compensating for temperature variations, and such a unit is shown in Figures 2, 3 and 4 and will be described in detail below.

The hydrogen ion concentration unit 37 operates according to known principles but the practical difficulties involved in adapting such principles to drilling muds are very great, due to the large content of solids therein. I have constructed such a unit, however, which has operated very successfully and this will be described more fully below in connection with Figure 5.

Gas analysis unit 38 is not shown in detail since it consists essentially of apparatus for removing gas from the stream of mud under vacuum, mixing it with a stream of air, passing the mixture over a resistance wire maintained at a definite temperature by means of an electrical current and measuring the rise in temperature due to combustion by means of a circuit adapted to measure the corresponding increase in the value of the resistance. Apparatus of this type is simple and can be easily constructed by one skilled in the art. Crude oil detecting unit 39 is based upon the known principle of subjecting drilling fluid to irradiation with ultraviolet light and using the resultant fluorescence as a measure of the presence or absence of crude oil. While crude oil detecting unit 39 may be of this or any other type, I prefer to use the apparatus heretofore described in my copending application Serial Number 367,816, filed November 29, 1940.

In addition to the above other tests may be continuously applied to the mud stream flowing through line 35. For example, knowledge of the density and viscosity of the returning mud is very helpful. Also, other types of data may be recorded which aid in giving a more complete picture of the progress of the drilling operation and of subsurface conditions, and examples of such data are drilling rate, mud pump rate, torque applied to the rotary cable, weight supported by the cable, etc.

One feature has been described which is very important, particularly when the presence and amount of gas in the drilling mud returns are determined, and that is the mode of sampling. It will be understood that my invention can be carried out by closing fill-up line connection 19 and connecting line 35 with line 34, but if this were done there would be considerable danger of loss or separation of gas and of pollution of the returning mud with oil from the derrick floor, so that a stream of mud obtained in this way would not be representative and might give totally erroneous results. By continuously bleeding off a sample of the thoroughly agitated returning mud from the fill-up line connection immediately below the blowout preventer, as shown in Figure 1, or at a point similarly located below the principal mud outlet, a continuous representative sample is obtained which will permit quantitative testing of the mud and consequently a more accurate evaluation of the formation characteristics.

From the above it will be apparent that I have described in its broad aspects a novel and efficient method of determining the presence of important non-hydrocarbon materials present in subsurface strata penetrated by the drill bit during a rotary drilling operation, and one which can be applied to a well being drilled simultaneously with other test methods adapted to round out a complete picture of formational conditions. This method has been described in connection with an ordinary drilling operation but it can be applied also to reverse circulation drilling, i. e., drilling with the mud forced down the annular space surrounding the drill pipe and up the interior thereof. Furthermore, it is especially useful when pressure drilling is employed, since under these conditions core drilling is impossible and even analysis of the cuttings yields little information because they are very considerably dispersed in the mud as it passes through the device used to maintain the back pressure.

Referring now to Figures 2 and 3, which illustrate a conductivity cell for continuously measuring the conductivity and therefore the electrolyte content of a stream of drilling fluid corresponding to conductivity unit 36 of Figure 1, a tubular body portion 50 of fiber, a synthetic resin or other electrical insulating material is provided having threads 51 at each end for connection in the mud line. Two rings 52 and 53 of brass or other electrical conducting material are placed in spaced grooves cut in the inner surface of body 50 so that they present surfaces to the mud flowing therein which are substantially flush with the inside of body 50. Rings 52 and 53 are preferably split at one point so that they can be inserted into body 50 and will snap into position in their respective grooves. These rings constitute the electrodes between which the conductivity of the flowing liquid is measured, appropriate electrical connections 54 and 55 being provided for incorporating them in the measuring circuit. While other electrode arrangements can be used, that shown is preferred since the flush construction enables the mud to flow freely by electrodes 52 and 53 and prevents the electrode surfaces from accumulating solid deposits.

A second cell containing a standard sample of electrolyte-containing liquid is maintained at the same temperature as the flowing stream under test as a part of the temperature compensation system mentioned above. This liquid must be one having a resistance-temperature relation like that of the mud undergoing test and can be, for example, a typical drilling mud containing a small amount of a soluble phosphate to minimize settling of the solids therein. As shown in Figures 1 and 2, this second cell is located directly in the path of the flowing stream between electrodes 52 and 53 and consists essentially of a relatively thin-walled tube 56 of fiber or other mechanically strong electrical insulator inserted with a tight fit into appropriate holes 57 and 58 bored into body 50 on opposite sides thereof. Both ends of tube 56 are closed by means of insulating plugs 59 and 60 through which bolts 61 and 62 are axially fastened by means of nuts 63 and 64 and nuts 65 and 66, respectively. The heads 67 and 68 of bolts 61 and 62, respectively, are spaced from each other by an adjustable distance within tube 56 and these act as the electrodes in the temperature compensation cell, the electrical connections thereto being made by means of knurled nuts 69 and 70.

It is apparent that the temperature of the standard fluid within tube 56 will remain very close to that of the flowing stream due to the indirect heat exchange relationship as long as the variations in the temperature of the latter are not too abrupt. In mud logging practice the temperature variations are seldom sudden and the conductivity test unit above-described is therefore well adapted to be used for continuously testing drilling mud returns.

In order to obtain measurements of the variations in electrical conductivity or resistivity in the stream of drilling mud flowing through the body 50 the resistivities between electrodes 52 and 53 and between electrodes 67 and 68 are compared on a bridge circuit. By way of example I have shown in Figure 4 a bridge circuit particularly suitable for recording the variations in conductivity of drilling muds. The flow cell itself is shown in highly simplified form with electrodes 52 and 53 representing those exposed to the flowing mud and electrodes 67 and 68 representing those in the temperature compensation cell. Although direct current can be used under some circumstances for the conductivity test I greatly prefer alternating current in order to avoid the difficulties arising from polarization, and this is supplied to the system from conductors 80 and 81 through transformer 82. The output from the secondary winding of transformer 82 is applied to one diagonal of a Wheatstone bridge network consisting of resistances 83 and 84 and the cells containing electrodes 52 and 53 and electrodes 67 and 68 by means of conductors 85 and 86, the latter conductor being connected to potentiometer-type resistance 87 located in the circuit between resistances 83 and 84. The purpose of resistance 87 is to facilitate the preliminary balancing of the bridge circuit. The potential difference across the other diagonal of this bridge is applied to a conventional bridge rectifier 88 by means of leads 89 and 90, and the rectified output is then impressed on meter 91 via conductors 92 and 93. Meter 91 is adapted to measure variations in direct current and preferably is of a recording type.

It will be apparent that the conductivity apparatus hereinabove described is capable of measuring and recording variations in the relative conductivities of the liquid stream between electrodes 52 and 53 and the standard liquid between electrodes 67 and 68. As already stated, this results in accurate determination of the electrolyte content of the flowing stream even at varying temperatures because the effect of a temperature change in the flowing liquid on the resistivity thereof is automatically compensated by a corresponding change in the resistivity of the liquid in the cell between electrodes 67 and 68.

Referring now to Figure 5, which shows a hydrogen ion concentration testing unit corresponding to unit 37 of Figure 1 particularly adapted for use in accordance with my invention, the flow cell through which the drilling mud passes consists essentially of a tube 100 of Bakelite, fiber or other electrical insulating material having suitable mechanical properties provided with threads 101 at each end for connection into the mud flow line. Obviously it is not necessary that the cell be tubular as long as it is a conduit through which the mud can be made to flow with a reasonably high velocity. An antimony electrode 102 is mounted in such a way that its active surface is substantially completely exposed to the movement of the mud stream and is thereby kept free from inactive films or deposits. As shown, electrode 102 is an elongated cylindrical block of antimony which has been pressed into a sheath 103 composed of a material such as fiber or Bakelite, which is a nonconductor of electricity, in such a way that the entire lateral surface of electrode 102 is substantially completely covered. It is only necessary, however, that the portion of this surface be covered which otherwise would be in contact with the mud. Sheath 103 is provided with external threads 104 cooperating with a suitable threaded opening in tube 100 so that the lower end 105 of electrode 102, which is the active surface, is maintained in the desired position. It is preferred that this active surface 105 should lie substantially in a plane parallel to the axis of tube 100 and that it should be relatively close to that axis in order that it may lie in the path of the most rapid flow of mud. By means of this arrangement I am able to keep electrode surface 105 always exposed to fresh mud and any deposits which may accumulate will occur only around the outside of sheath 103 where they cannot affect the electrical potential of the cell.

Spaced a short distance from electrode 102 along tube 100 a standard half-cell is provided. This is preferably of the calomel type and as shown consists of a glass or preferably a transparent synthetic plastic tube 106 closed at its lower end by an insulating plug 107 which extends through a suitable threaded opening in tube 100. Extending through and upwardly from plug 107 is a glass tube 108 having a plug 109 sealed at its lower end composed of a porous material, preferably a ceramic substance such as porcelain. Tube 106 contains at its lower end a mixture of mercury and calomel in paste form and above this is a conducting solution, preferably a saturated potassium chloride solution extending above the upper end of tube 108 so that an electrical current is free to pass between the mercury-calomel mixture and the mud flowing in tube 100. A threaded cover 110 is provided for tube 106 so that it can be easily removed and additional conducting solution added. Mounted on the lower end of tube 106 is a binding post 111 from which a conductor 112 such as a platinum wire extends through a hole in tube 106 which is subsequently sealed, into the mercury-calomel paste, thus providing means for connecting the standard half-cell into an appropriate circuit. The surface of plug 109 is also arranged so that it is kept free of deposits, etc. and is preferably located so that its surface is approximately parallel to the axis of tube 100 and relatively close to that axis.

It will be seen from the above that I have provided a simple and rugged cell for the determination of the hydrogen ion concentration of a flowing stream of drilling mud and that this is arranged in such a way as to eliminate any difficulty from deposited solid material, etc. It is believed to be unnecessary to describe the principle of operation of this cell since that principle is well-known to those skilled in the art. It is apparent, however, that the potential difference existing at any time between electrode 102 and binding post 111 will be a function of the hydrogen ion concentration of the drilling mud flowing through tube 100, and this potential difference can be measured and/or recorded by any suitable method.

As shown in Figure 5, however, this potential difference is impressed upon an amplifying unit by means of binding post 113 and conductors 114 and 115. The amplifier shown is of the two-stage resistance-coupled type, of which a detailed description is believed to be unnecessary. However, the potential difference across conductors 114 and 115 is applied to the grid of vacuum tube 116 which has a plate circuit including battery 117 and resistance 118. Suitable grid bias for this tube is supplied by battery 117 and voltage divider 119. Increase in the pH of the mud flowing through cell 100 will cause an increased negative potential difference across the grid of tube 116, thus causing greatly decreased current flow in the plate circuit thereof and a correspondingly decreased potential difference across resistance 118. This last-mentioned potential difference is applied to the grid of tube 120 by means of conductor 121 and a filament connection 122 leading to a voltage divider 123 shunted through resistance 124 across battery 117, this grid voltage being kept at a proper value in relation to the pH of the mud being tested by proper adjustment of voltage divider 123. Changes in the potential difference across resistance 118, however, are applied in full to the grid of tube 120, again resulting in a greatly amplified plate current and a change in potential difference which is impressed by leads 125 upon a recording unit 126. Recorder 126 is preferably of the type consisting essentially of a milliameter. In order to adjust the scale reading and sensitivity of recorder 126 a variable resistance 127 and a circuit including battery 128 and adjustable resistance 129 are placed in parallel with it.

It is apparent from the above description that I have provided a novel and useful method and apparatus for logging wells and particularly for determining the nature of non-hydrocarbon materials encountered during the drilling thereof. In order to be of maximum utility both the conductivity and the hydrogen ion concentration of the drilling mud returning from the well should be recorded continuously and preferably on the same recording medium, so that the resulting records can be compared with the greatest facility. The variations in other properties of the drilling mud or the results of other tests can advantageously be recorded at the same time in order that the most complete information may be derived from the data.

Obviously many modifications may be made within the spirit of my invention and I do not therefore wish to be limited to the specific embodiments described herein but only by the scope of the appended claims.

I claim:

1. The method of logging the subsurface formations encountered in a well during a drilling operation employing a circulating stream of drilling fluid which comprises substantially simultaneously and separately measuring variations in the electrical conductivity and the hydrogen ion concentration of at least a portion of said drilling fluid returning from the bottom of said well to provide a basis for distinguishing between substances encountered in said drilling operation which possess relatively high electrical conductivity and which are substantially neutral and substances which also possess relatively high electrical conductivity but which are not substantially neutral.

2. The method of logging the subsurface formations encountered in a well during a drilling operation employing a circulating stream of drilling fluid which comprises substantially simultaneously and separately measuring variations in the electrical conductivity and the hydrogen ion concentration of at least a portion of said drilling fluid returning from the bottom of said well, and comparing the measurements of electrical conductivity and hydrogen ion concentration to distinguish between high electrical conductivity occasioned by substantially neutral substances such as salt and salt water on the one hand and by substances giving a hydrogen ion concentration departing substantially from the neutral on the other hand.

3. The method of logging the subsurface formations encountered in a well during a rotary drilling operation employing a circulating stream of drilling fluid which comprises continuously, substantially simultaneously and separately measuring variations in the electrical conductivity and the hydrogen ion concentration of substantially the same portion of said drilling fluid returning from the bottom of said well, and recording each of said measurements to provide a basis for distinguishing between substances encountered in said rotary drilling operation which possess relatively high electrical conductivity and which are substantially neutral and substances which also possess relatively high electrical conductivity but which are not substantially neutral.

4. The method of logging the subsurface formations encountered in a well during a rotary drilling operation employing a circulating stream of drilling fluid which comprises continuously, substantially simultaneously and separately measuring variations in the electrical conductivity and the hydrogen ion concentration of substantially the same portion of said drilling fluid returning from the bottom of said well, recording each of said measurements, and comparing the records of said two measurements to distinguish between high electrical conductivity occasioned by substantially neutral substances such as salt and salt water on the one hand and by substances giving a hydrogen ion concentration departing substantially from the neutral on the other hand.

5. The method of logging the subsurface formations encountered in a well during a rotary drilling operation employing a circulating stream of drilling fluid which comprises continuously and separately measuring variations in the electrical conductivity and the hydrogen ion concentration of at least a portion of said drilling fluid returning from the bottom of said well, and recording each of said measurements continuously and in juxtaposition, whereby comparison thereof is facilitated, to provide a basis for distinguishing between substances encountered in said rotary drilling operation which possess relatively high electrical conductivity and which are substantially neutral and substances which also possess relatively high electrical conductivity but which are not substantially neutral.

6. The method of logging the subsurface formations encountered in a well during a rotary drilling operation employing a circulating stream of drilling fluid which comprises continuously and separately measuring variations in the electrical conductivity and the hydrogen ion concentration of at least a portion of said drilling fluid returning from the bottom of said well, and comparing said measurements taken on portions of said drilling fluid which left the bottom of said well substantially simultaneously, to distinguish between substances encountered in said rotary drilling operation which possess relatively high electrical conductivity and which are substantially neutral and substances which also possess relatively high electrical conductivity but which are not substantially neutral.

7. The method of determining the nature of subsurface formations during the drilling of a well by the rotary method which comprises circulating a stream of drilling fluid down to the bottom of said well and back to the surface of the earth, whereby the returning fluid contains a portion of the material composing the formation being drilled, and continuously measuring variations in the electrical conductivity and the hydrogen ion concentration of at least a portion of said returning fluid, to provide a basis for distinguishing between materials encountered in said rotary drilling operation which possess relatively high electrical conductivity and which are substantially neutral and materials which also possess relatively high electrical conductivity but which are not substantially neutral.

8. Apparatus for logging the subsurface formations encountered in a well, during a rotary drilling operation employing a circulating stream of drilling fluid comprising means for substantially simultaneously and separately measuring variations in the electrical conductivity and the hydrogen ion concentration of at least a portion of said drilling fluid returning from the bottom of said well and means for continuously recording each of said measurements to provide a basis for distinguishing between substances encountered in said rotary drilling operation which possess relatively high electrical conductivity and which are substantially neutral and substances which also possess relatively high electrical conductivity but which are not substantially neutral.

9. Apparatus for logging the subsurface formations encountered in a well during a rotary drilling operation employing a circulating stream of drilling fluid comprising means for causing at least a portion of said drilling fluid returning from the bottom of said well to flow in a continuous stream, a pair of electrodes in contact with said stream, means for passing an electrical current between said electrodes through said fluid, means for maintaining a standard sample of drilling fluid or the like at substantially the same temperature as said steam, means for passing a second electrical current through said sample, a bridge circuit for measuring a resultant of the variation in said electrical currents, whereby the resistivity measurements are substantially corrected for variations in the temperature of said stream of drilling fluid, an antimony electrode and a reference electrode in electrical contact with said stream of drilling fluid, and means for measuring a function of the potential difference between said antimony electrode and said reference electrode to provide a basis for distinguishing between substances encountered in said drilling operation which possess relatively high electrical conductivity and which are substantially neutral and substances which also possess relatively high electrical conductivity but which are not substantially neutral.

ROBERT W. STUART.